United States Patent [19]

Heeks et al.

[11] Patent Number: 4,834,538

[45] Date of Patent: May 30, 1989

[54] FIBRE OPTIC GYROSCOPE WITH NULLING FEEDBACK CONTROL LOOP

[75] Inventors: John S. Heeks, Old Harlow; Michael C. Bone, Saffron Waldon; Emlyn Jones, Harlow; James W. Parker, Bishop's Stortford, all of Great Britain

[73] Assignee: STC PLC, London, England

[21] Appl. No.: 146,022

[22] Filed: Jan. 20, 1988

[30] Foreign Application Priority Data

Mar. 19, 1987 [GB] United Kingdom ............... 8706565

[51] Int. Cl.$^4$ .................. G01B 9/02; G01C 19/64
[52] U.S. Cl. ................................... 356/350
[58] Field of Search .................................. 356/350

[56] References Cited

U.S. PATENT DOCUMENTS 4,326,803  4/1982  Lawrence ....................... 356/350

Primary Examiner—Vincent P. McGraw
Attorney, Agent, or Firm—Lee & Smith

[57] ABSTRACT

A fibre optic gyroscope arrangement having a nulling feedback control loop, the gyroscope including means 40 for varying wavelength of the light source 41 for a predetermined period of time at switch-on of the gyroscope and means for subsequently operating the light source 41 at a fixed wavelength.

8 Claims, 5 Drawing Sheets

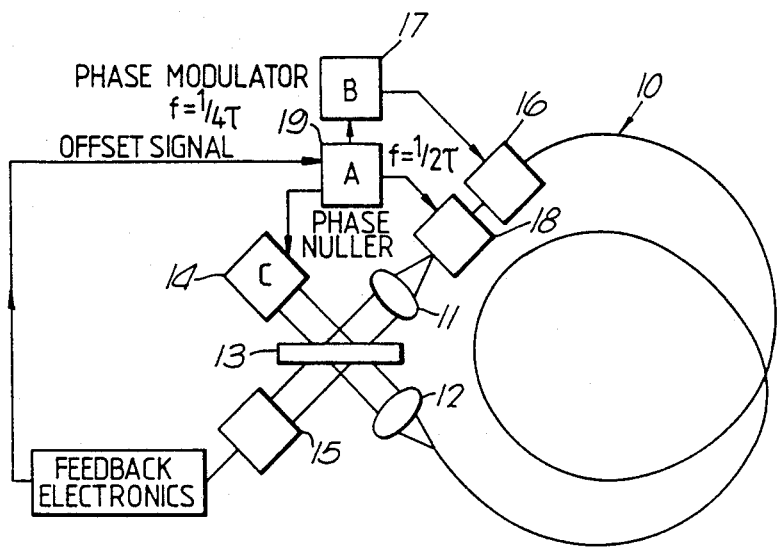
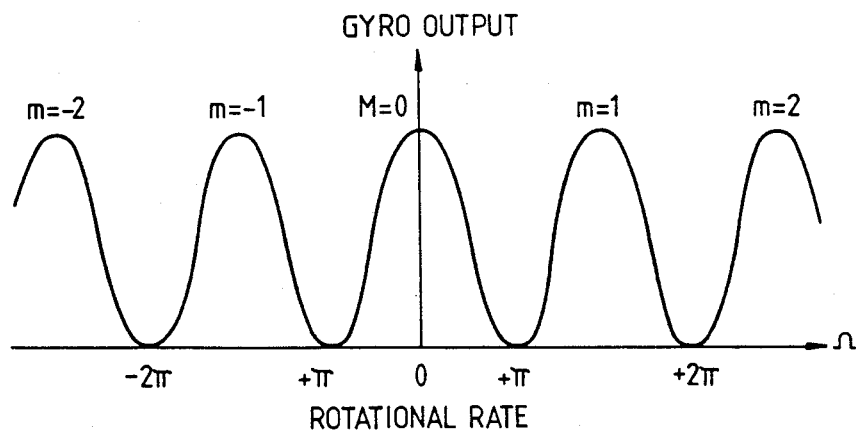

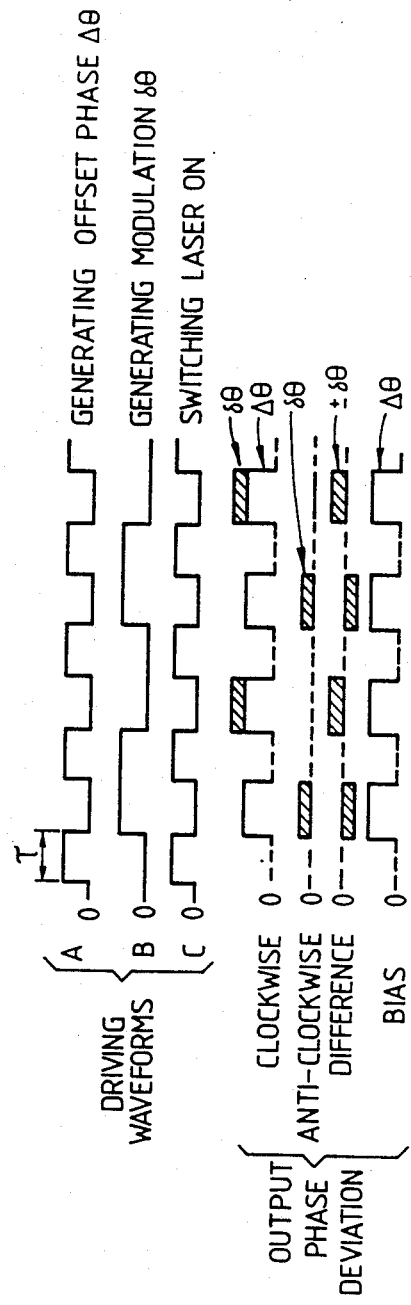

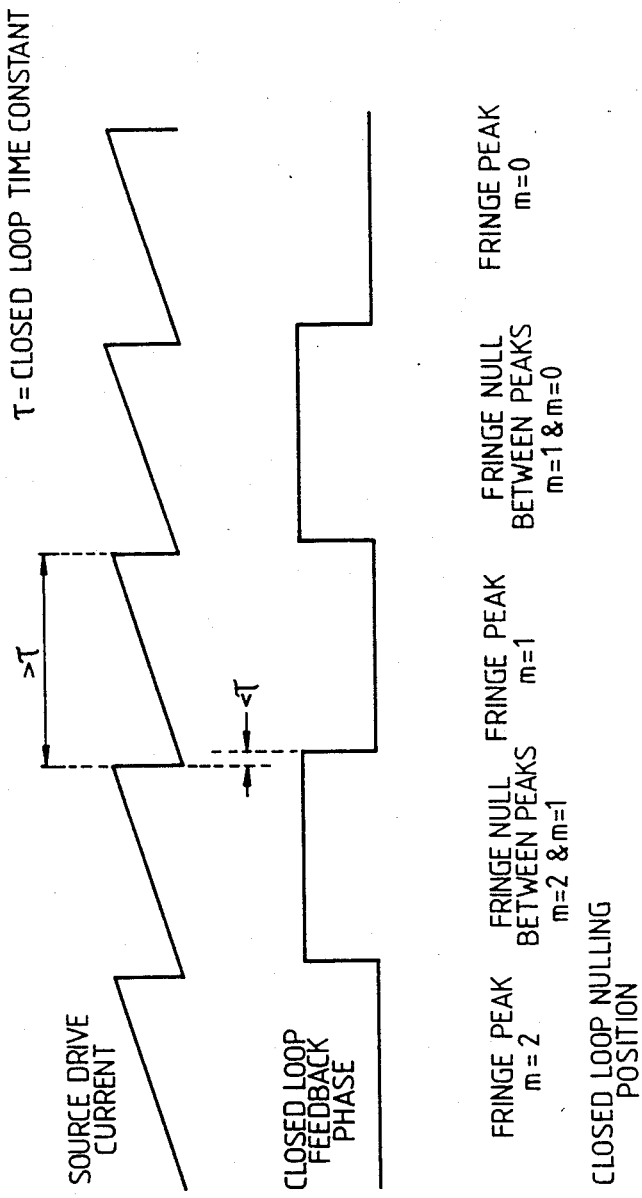

FIBRE OPTIC GYROSCOPE WITH NULLING FEEDBACK CONTROL LOOP

FIELD OF THE INVENTION

This invention relates to removal of the rotation rate ambiguity in fibre optic gyroscopes.

The optical fibre gyroscope utilises the so-called Sagnac effect. Light from a laser is split two ways and launched simultaneously into opposite ends of a length of optical fibre formed in a loop, i.e. in counter rotating directions in the loop. When the loop is rotated in the plane of the loop the light travelling in the same direction as the loop rotation has effectively further to travel than the light travelling against the loop rotation. The difference between the two effective path lengths increases linearly as the rotation rate increases, resulting in an alteration in interference fringes when the light outputs from the two ends of the fibre are combined. The fringe positions can be detected and used to determine the gyro rotation rate.

It is well known that the form of the output from a simple fibre optic gyroscope is sinusoidal as a function of linearly increasing rotation rate. More precisely, it has the form $$O/P = 1 + \cos\left|\frac{8\pi N.A.\Omega}{c\lambda_o}\right|$$

where
N = the number of turns of fibre
A = the area enclosed by the fibre
$c = 3 \times 10^8$ ms$^{-1}$
$\lambda_o$ = the source wavelength (in vacuo)
$\Omega$ = the rotation rate If the gyro is switched on whilst rotating at a relatively high rate, then it is not possible to determine simply on which fringe the output is occurring. Hence there is an ambiguity in measuring the rotation rate.

DESCRIPTION OF RELATED ART

British Pat. No. 2108652 describes a method for generating a linear output as a function of rotation rate. It discloses the use of two square wave phase modulators, placed at one end of the fibre coil, operating at frequencies f and 2f, where in the optimum case $f=\frac{1}{4}\tau$ with $\tau$ the transit time of the light in the coil. By adjusting the amplitude of the 2f waveform in a closed loop system so as to null the 'f' component of the gyro output, the patent shows that the amplitude of the 2f signal is then linearly proportional to rotation rate. However, it is still possible for the feedback loop to close on any fringe if the system is switched on during high rotation and so the ambiguity problem still exists.

The amplitude of the 2f phase modulation can be written as $$\phi_{2f} = \frac{RV_{2f}}{\lambda_o} \quad (1)$$

where R is the modulator scale factor and $V_{2f}$ is the amplitude of the applied voltage.

The Sagnac phase shift is $$\phi_s = \frac{8\pi N.A.\Omega}{\lambda_o c} \quad (2)$$

and nulling occurs when $$2\phi_{2f} = \phi_s + 2m\pi \quad (3)$$

where $m(=0, \pm 1, \pm 2 \ldots)$ is the fringe number.

Substituting (1) and (2) into (3) and rearranging gives $$v_{2f} = \frac{4\pi N.A.\Omega}{R \cdot c} + \frac{m\pi \lambda_o}{R} \quad (4)$$

Note that equation (4) shows $V_{2f}$ linearly proportional to $\Omega$ with an offset which is proportional to $m\lambda_o$.

It is this offset which provides the basis of the patent application. It can be seen that when the gyro is on the zero order fringe (m=0), the nulling voltage $V_{2f}$ is independent of source wavelength, whereas for any other fringe, a change in source wavelength results in a change of nulling voltage which is proportional to the fringe number.

SUMMARY OF THE INVENTION

According to the present invention there is provided a fibre optic gyroscope arrangement having a nulling feedback control loop, the gyroscope including means for varying the light source wavelength for an initial period of time at switch-on of the gyroscope and means for subsequently operating the light source at a fixed wavelength.

BRIEF DESCRIPTION OF THE DRAWINGS

Embodiments of the invention will now be described with reference to the accompanying drawings, in which:

FIG. 1 illustrates a fibre optic gyroscope arrangement employing a closed loop nulling feedback circuits, FIG. 2 illustrates the optical intensity output from the basic fibre optic arrangement, FIG. 3 illustrates driving waveforms and associated phase responses for the arrangement of FIG. 1, FIG. 7 illustrates waveforms relating to another method of removing the rotation rate ambiguity by modulating the light source drive current.

DESCRIPTION OF THE PREFERRED EMBODIMENTS

Figure 4:
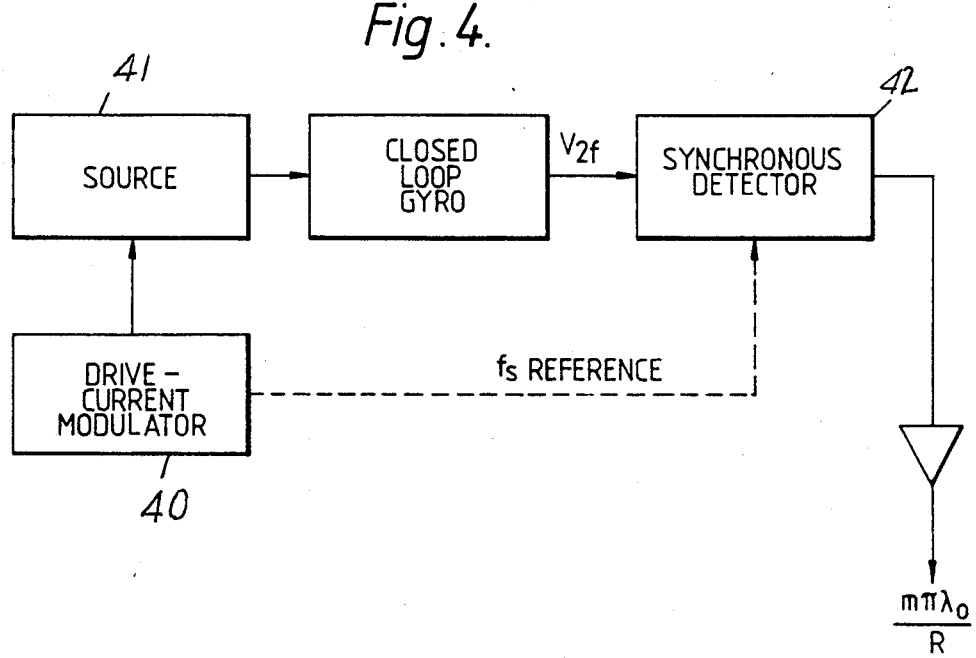
FIG. 4 illustrates one method of measuring ambiguity in a fibre optic gyro by modulation of the light source drive current.

The basic fibre-optic gyroscope shown in FIG. 1 consists essentially of a single or multi-turn coil of optical fibre 10, which is coupled via focussing lenses 11, 12 and a beam splitter 13 to an optical source 14 and a photodetector 15. (Ignore for the moment the other components in the Figure). Light launched from the source 4 is split equally at the beam splitter 13 and coupled into each end of the fibre 10, where it is propagated round the coil in both directions simultaneously. Upon emergence the two light outputs from the fibre are each split again equally at the beam splitter and half of each output will reach the photodetector 15. The two half outputs reaching the photodetector will mutually interfere at the plane of the photodetector. In general the superposition of the two output waves results in an interference pattern of concentric interference rings. In a well adjusted optical system only the central fringe is present and this central area is focussed onto the photodetector. If now the gyroscope is rotated about the axis of the coil, phase differences occur in the two outputs from the fibre which give rise to a change of light intensity at the photodetector. The photodetector response to the changing phase deviation $\Delta\theta$ arising from the rotation will have the form shown in FIG. 2, in which the output current i is at a central peak for zero rotational velocity falling to a first null and then rising to a second peak and so on as the speed of rotation is increased. The same kind of output is obtained in a "reciprocal architecture" FOG which uses an additional beam splitter and a mode filter to define a common input/output port. Such a reciprocal-architecture FOG is prepared to the basic system illustrated in FIG. 1.

To eliminate the inherent d.c. nature of the output when the gyroscope is rotated at a constant angular velocity, phase modulation of the optical signals can be utilised. To illustrate how this phase modulation is accomplished consider a phase shifter 18, of electro-optic or other type, positioned at one end of the fibre loop or coil as in FIG. 1. This phase shifter is driven by a phase modulator 19 which applies a bias signal to the shifter for alternate periods of duration $\tau$, where $\tau$ is the optical transit time in the loop or coil 10. As a consequence of the asymmetric placement of the phase shifter 18 every other transit of the clockwise wave will experience an electrically derived increment of phase shift and alternate anticlockwise transits will experience an identical phase shift. This leads to a phase modulation on the Sagnac signal at frequency $1/(2\tau)$ with resulting amplitude modulation at the photodetector output of the interferometer.

With the addition of synchronous switching of the light source, it is possible to apply the externally applied phase shift to only one of the contra-propagating waves. This forms the basis for cancelling the Sagnac signal and operating the sensor in a closed loop phase nulled circuit. Alternatively the photodetector output may be gated, with the same effect. The following discussion assumes a switched light source however. This mode of operation is schematically in FIG. 1 with the phase shifter 18 forming the phase nuller in conjunction with the synchronously switched laser source 14. Modulation is now applied in a second electro-optic phase shifter 16 which is also interposed between lens 11 and the fibre end and is driven by a phase nuller 17 which applies a bias signal for alternate periods of duration $2\tau$. As a consequence of the asymmetric placement of the phase shifter 16 and the relative phase of the driving waveforms to shifters 16 and 18, as indicated in FIG. 3, every other transit of the clockwise optical signal will experience an electrically derived increment of phase shift and alternate anticlockwise transits will experience an identical phase shift. This leads to a phase modulation of the Sagnac signal at $1/(4\tau)$ with resulting amplitude modulation at the photodetector output of the interferometer. Alternatively the outputs of 17 and 19 can be added electronically and applied to a single phase shifter. With no Sagnac phase displacement, and zero modulation signal applied to the phase shifter 18, there will be zero modulation component at frequency $1/(4\tau)$ at the photodetector output. Conversely the photodetector output at frequency $1/(4\tau)$ will be at its maximum value when the Sagnac phase deviation has increased to $\pi/2$. The action of the closed control loop is, via the amplitude and sense of the drive to phase shifter 18, to drive the phase difference to zero. The amplitude and sense of the drive to phase shifter 18 in this condition then represents a measure of the rotation rate.

The ambiguity problem referred to above is solved by modulating the light source drive current for a short period of time after switch on by modulator 40, FIG. 4. Let the closed loop, operating with negative feedback, be at a point given by equation (4) with $m \neq 0$. The wavelength $\lambda_o$ of source 41 is initially sinusoidally modulated, by modulation of the drive current, and its frequency fs should be low compared with the time constant of the closed loop. Due to the second term of equation (4) the output of the closed loop will contain a component at frequency fs. The amplitude of this component is proportional to the fringe number m, and the phase of this component is either in phase with the source modulation or in antiphase, depending on whether m is positive or negative.

The closed loop output component at frequency fs can be measured by a synchronous detector 42, for example a lock-in amplifier, connected as shown in FIG. 4. The output of the synchronous detector is a bipolar voltage which is proportional to m. The synchronous detector output is then amplified, using the appropriate voltage gain, to give a voltage approximately equal to $m\pi\lambda_o/R$ where $\lambda_o$ is the average source wavelength.

It remains to subtract this voltage $\pi\lambda_o/R$ from the closed loop output voltage $V_{2f}$(equation 1) to move the operating point to the central fringe at $m=0$. Note that it is only necessary to achieve this correction approximately. Once the operating point is established close to $m=0$ on the central fringe, normal operation of the gyro closed loop will subsequently adjust the operating point to its correct position. If the closed loop gain is sufficiently high the final operating point will be essentially exactly at $m=0$.

Two methods for applying the correction $m\pi\lambda_o/R$ to the closed loop operating point are explained below.

Figure 5A:
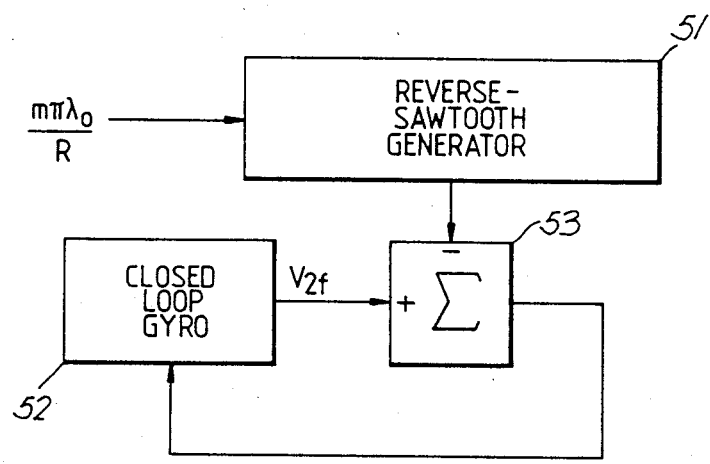
FIGS. 5a and 5b illustrate a voltage correction circuit and a waveform therefor which removes the rotation rate ambiguity.

In the first method an "offset voltage" waveform from generator 51 is subtracted from the output $V_{2f}$ of the closed loop gyro 52 in a conventional voltage summing circuit 53 (FIG. 5a). The output of the summing circuit is fed back to the closed loop gyro. Thus the voltage summing circuit now forms half of the closed loop which is otherwise unchanged.

Figure 5B:
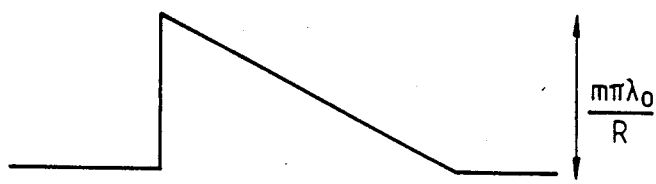

The offset voltage waveform is one cycle of a "reverse sawtooth" (FIG. 5b) which rises rapidly to the value $m\pi\lambda_o/R$, then falls slowly to zero. The form of this waveform is not critical, i.e. the rise and fall need not be linear. The purpose of the offset voltage waveform is to apply the correction $m\pi\lambda_o/R$ quickly, within the time constant of the closed loop, and to withdraw it slowly. The rapid application of the voltage $m\pi\lambda_o/R$ forces the closed loop from the m'th fringe to the central fringe at $m=0$. While the offset voltage is gradually withdrawn, the closed loop maintains its operating point on the central fringe. The result is that when the offset voltage waveform has returned to zero the correction $m\pi\lambda o/R$ has been transferred to the closed loop gyro output.

Figure 6:
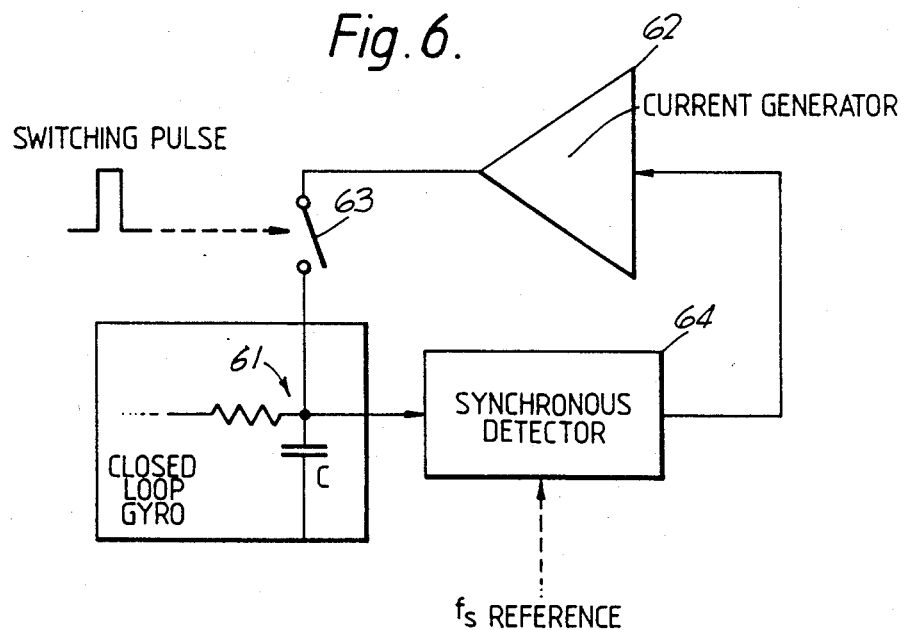
FIG. 6 illustrates an alternative method of correcting ambiguity in a fibre optic gyro with a current correction circuit.

The second method makes the assumption that the closed loop output voltage is generated across a capacitor, for example a capacitor C which together with a resistor forms a low pass filter 61 as shown in FIG. 6. A current generator 62 is connected to the capacitor through a switch 63, and in order to effect the required voltage correction $-m\pi\lambda o/R$ the switch is closed for a predetermined period of time which is short compared with the time constant of the closed loop.

The current generator is driven by a synchronous detector 64 operated as in FIG. 1, so that the current is proportional to $m\pi\lambda o/R$. The scale factor of the current generator is chosen in conjunction with the switching time and the value of C, so that the current pulse delivered while the switch is closed changes the charge on the capacitor by approximately $m\pi\lambda oC/R$. The closed loop output is thereby reduced permanently by $m\pi\lambda o/R$ because the closed loop then locks to the central fringe at $m=0$.

In as alternative method of solving the ambiguity problem, the zero order fringe can be found as follows by sawtooth modulation of the optical source wavelength. At switch on the closed loop described previously has a negative feedback polarity so that it settles on a peak of one of the output fringes. By slowly ramping up the source drive current the output wavelength is decreased and the fringe peaks crowd closer together, so that if $m=0$ the operating point moves in the direction of the zero fringe. Upon rapid flyback of the source drive current waveform the peaks move apart again but the closed loop lags behind, and so if the polarity of the feedback is now reversed, the closed loop settles on a fringe null (see FIG. 7). A repeat of this process with a second period of the sawtooth modulation and a second reversal of the feedback polarity causes the closed loop to settle on a new peak, adjacent to the original one, but closer to the zero fringe. The process is repeated until the nulling voltage is no longer affected by changing the source drive current.

We claim:

1. A fibre optic gyroscope arrangement comprising:
   a length of optical fibre formed in a loop,
   a laser light source,
   means for launching light from the laser source simultaneously into opposite ends of the length of fibre, whereby the light is travelling in counter rotating directions in the loop,
   means for determining differences between the two effective path lengths of the counter rotating light in the fibre,
   means for modulating the light launched into one end of the fibre at first and second frequencies f and 2f respectively, where $f=\frac{1}{4}t$ with t being the transit time of the light in the fibre loop,
   means for adjusting the amplitude of the 2f waveform in a closed loop feedback system by applying a feedback voltage to the modulating means so as to null the f component of the gyroscope output,
   means for varying the wavelength of the laser light source for an initial period of time at switch-on of the gyroscope, and
   means for subsequently operating the laser light source at a fixed wavelength.

2. An arrangement according to claim 1 wherein the means for varying the light source wavelength comprises means for modulating sinusoidally the drive current of the light source, the arrangement further including means for synchronously detecting the closed loop output component at said modulating frequency, means for deriving a voltage proportional to said component and means for subtracting said derived voltage from the feedback voltage.

3. An arrangement according to claim 2 wherein the means for subtracting said derived voltage includes means for generating one period of a "reverse sawtooth" voltage waveform of initial value equal to the derived voltage and decaying to zero, and means for subtracting said reverse sawtooth voltage waveform from the feedback voltage.

4. An arrangement according to claim 2 wherein the means for subtracting said derived voltage includes a current generator to which said derived voltage is applied to produce a current proportional to the value of the derived voltage, a capacitor across which a closed loop output voltage/feedback voltage is generated, and switch means connected to subtract the current generated to reduce the voltage across the capacitor by an amount approximately equal to the derived voltage.

5. An arrangement according to claim 1 wherein the means for varying the light source wavelength comprises means for applying the drive current of a light source with a regular sawtooth drive current component for said initial period of time and means for periodically reversing the polarity of the feedback voltage until such time that the closed loop voltage is independent of the source wavelength.

6. A method of operating a fibre optic gyroscope arrangement comprising:
   a length of optical fibre formed in a loop,
   a laser light source,
   means for launching light from the laser source simultaneously into opposite ends of the length of fibre whereby light is travelling in counter rotating directions in the loop,
   means for determining differences between the two effective path lengths of the counter rotating light in the fibre,
   means for modulating the light launched into one end of the fibre at first and second frequencies f and 2f respectively, where $f=\frac{1}{4}t$ with t being the transit time of the light on the fibre loop, and
   means of adjusting the amplitude of the 2f waveform in a closed loop feedback system by applying as feedback voltage to the modulating means so as to null the f component of the gyroscope output,
   the method including the steps of varying the wavelength of the laser light source for an initial period of time at switch-on of the gyroscope, and
   subsequently operating the laser light source at a fixed wavelength.

7. A method according to claim 6, wherein the light source wavelength is modulated sinusoidally, the method further including the steps of synchronously detecting a voltage feedback component at said modulating frequency, deriving a voltage proportional to said component and subtracting said derived voltage from the feedback voltage.

8. A method according to claim 7 wherein the light source wavelength is modulated by a regular sawtooth drive current component for said initial period of time and the polarity of the closed loop is reversed periodically until the rotation rate ambiguity is removed.

* * * * *